United States Patent [19]

Ozawa

[11] Patent Number: 5,426,586

[45] Date of Patent: Jun. 20, 1995

[54] ROBOT DRIVE JOINT CONTROL SYSTEM

[75] Inventor: Nobuaki Ozawa, Saitama, Japan

[73] Assignee: Honda Giken Kogyo Kabushiki Kaisha, Tokyo, Japan

[21] Appl. No.: 25,323

[22] Filed: Feb. 25, 1993

[30] Foreign Application Priority Data

Feb. 26, 1992 [JP] Japan .................................. 4-075518

[51] Int. Cl.6 ............................................. G06F 7/70
[52] U.S. Cl. ........................... 364/424.02; 364/424.01; 364/463; 180/8.6; 180/8.1; 180/8.2; 901/33; 901/1; 318/568.12; 395/80; 395/95; 395/85; 414/734; 414/730
[58] Field of Search .............. 364/424.02, 463; 901/1, 901/47, 29, 40; 180/8.1, 8.2, 8.5; 318/568, 12, 568.1; 395/80, 82, 84, 95, 96, 97; 414/734, 730, 786; 73/1 B

[56] References Cited

U.S. PATENT DOCUMENTS

| | | | |
|---|---|---|---|
| 4,575,304 | 3/1986 | Nakagawa et al. | 414/730 |
| 4,620,436 | 11/1986 | Hirabayashi et al. | 73/1 B |
| 4,834,200 | 5/1989 | Kajita | 180/8.1 |
| 5,151,859 | 9/1992 | Yoshino et al. | 364/424.02 |
| 5,159,988 | 11/1992 | Gomi et al. | 180/8.6 |
| 5,221,883 | 6/1993 | Takenaka et al. | 318/568.12 |
| 5,252,901 | 10/1993 | Ozawa et al. | 318/568.12 |
| 5,255,753 | 10/1993 | Nishikawa et al. | 180/8.6 |
| 5,265,195 | 11/1993 | Jinno et al. | 395/96 |
| 5,302,221 | 5/1994 | Shimokoshi et al. | 414/734 |
| 5,337,235 | 8/1994 | Takahashi et al. | 364/424.02 |

FOREIGN PATENT DOCUMENTS 3161290 7/1991 Japan .
3184782 8/1991 Japan .

*Primary Examiner*—Kevin J. Teska
*Assistant Examiner*—Jacques H. Louis-Jacques
*Attorney, Agent, or Firm*—Lyon & Lyon

[57] ABSTRACT

A system for controlling the locomotion of a biped walking robot by absorbing the footfall impact such that the robot walks stably. In advance, constraint conditions for the robot such as a coordinates position of the robot's center of gravity for the robot to assume a predetermined attitude are preestablished and in walking, robot's joint angles are determined inverse kinematically from the preestablished attitude constraint conditions. The ground reaction force generated at the footfall is detected and a correction amount required for shifting the center of gravity in the impact force absorbing direction is calculated. The attitude constraint conditions are recalculated in response to the correction amount and then the robot's joint angles are recalculated from the corrected attitude constraint conditions in three-dimensional, or at least in one of two-dimensional planes. Instead of the center of gravity, the robot's hip section can be used.

11 Claims, 17 Drawing Sheets

$X = l1\cos(\phi1) + l3\cos(\phi1+\phi3)$
$Y = l1\sin(\phi1) + l3\sin(\phi1+\phi3)$ $$Gx = \frac{m1 l2\cos(\phi1+\phi2) + m2\{l1\cos(\phi1) + l4\cos(\phi1+\phi3+\phi4)\}}{m1+m2}$$

$$Gy = \frac{m1 l2\cos(\phi1+\phi2) + m2\{l1\cos(\phi1) + l4\cos(\phi1+\phi3+\phi4)\}}{m1+m2}$$

ROBOT DRIVE JOINT CONTROL SYSTEM

BACKGROUND OF THE INVENTION

1. Field of the Invention

This invention relates to a system for controlling the drive joints in a robot, more particularly to a system for controlling drive joints in a legged mobile robot such as a biped walking robot so as to soften footfall impact.

2. Description of the Prior Art

As shown in FIGS. 19A and 19B, so long as the feet of an autonomous biped walking robot or other type legged mobile robot are in contact with the ground, the robot is acted on by forces from the ground surface. Such an external force will hereinafter be referred to as a "ground reaction force." One of the ground reaction forces received by a legged mobile robot during locomotion acts as a vibration-producing impact over a short period following the landing (footfall) of the foot of a free leg. This will hereafter be referred to as a "footfall impact." A large footfall impact may act as a disturbance which destabilizes the robot's locomotion. In the worse case it may cause the robot to tip over.

It was for this reason that, earlier, in Japanese Patent Application No. 1(1989)-297,199 (Japanese Laid-Open Patent Publication No. 3(1991)-161,290), the assignee proposed a technology for softening footfall impact by controlling the ankle drive joints in response to footfall impact. If the capability of absorbing and softening footfall impact can be enhanced still further, there can be expected to be obtained even more stable robot locomotion. In particular, there can be expected to be obtained more stable locomotion in situations where the footfall impact tends to be high, as during walking over rough terrain or walking at high speed.

Footfall impact can be treated as a force acting on the robot's center of gravity. As shown in FIG. 20, however, the earlier technology softened footfall impact solely through control of the ankle joints (indicated by hatching). Since it was therefore unable to achieve large shifts in the center of gravity, the absorption of footfall impact was inadequate. Another problem with the earlier technology is that it cannot perform an absorption operation when the whole sole of the foot is in contact with the ground.

As just noted, the locomotion of a legged mobile robot becomes more unstable as the footfall impact gets larger. To say that a footfall impact is large means that its maximum value is high and the period over which it acts (its duration) is long. Since there is a strong tendency for the duration of a footfall impact to grow longer with increasing maximum value, reduction of the footfall impact impulse (the integral of the force over an interval of time) can be achieved by holding down the maximum value of the footfall impact. In particular, since a close relationship can be observed between the locomotion stability of a legged mobile robot and the maximum value of the footfall impact, one of the key aspects of stabilizing the locomotion of a legged mobile robot is that suppressing the maximum value of footfall impact is sufficient for achieving the stabilization. Moreover, since, as was pointed out earlier, a footfall impact can be deemed to be a force acting on the robot's center of gravity, locomotion can be stabilized by holding the maximum acceleration of the center of gravity to a low level.

SUMMARY OF THE INVENTION

One object of the present invention is to provide a robot drive joint control system which responds to an external force acting on the robot by positively moving the center of gravity or another specified portion or section of the robot from its prescribed position in a direction which softens the impact of the external force.

Another object of the invention is to provide a robot drive joint control system which conducts the operation for softening an impact over a prescribed period of time so as to disperse the impact over said period.

For realizing these objects, the present invention provides a system for controlling the locomotion of a legged walking robot having a body and legs each connected to the body, comprising first means for detecting external force or moment acting on the robot when the leg is landed on the ground, second means for calculating a correction amount required for a predetermined robot's portion to shift in a direction in which the detected external force or moment reduces, and third means for determining robot's joint angles inverse kinematically in response to the calculated correction amount.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped robot as an example of a robot.

Figure 1:
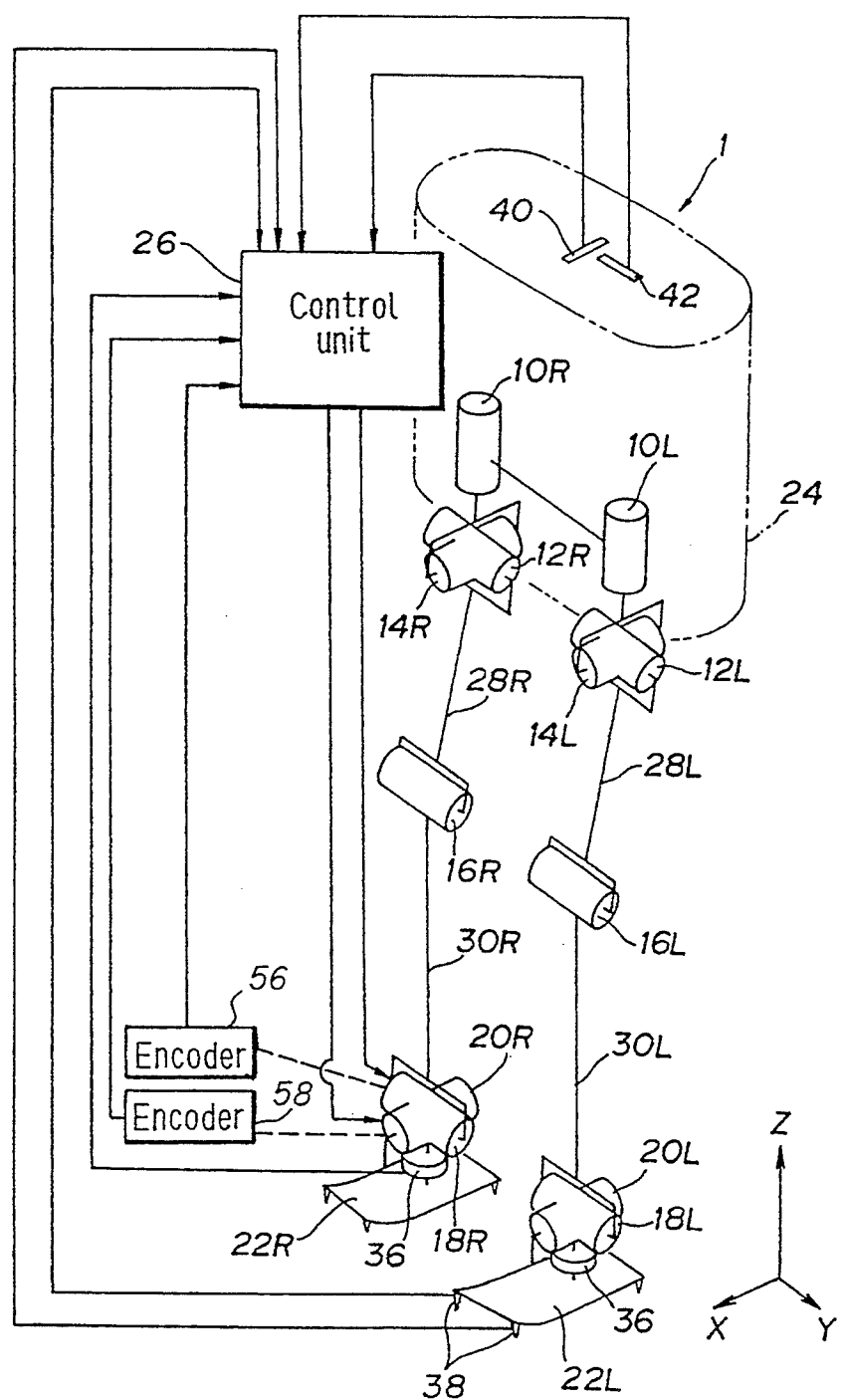
FIG. 1 is a schematic view showing the overall configuration of the robot drive joint control system according to the invention.

An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (x direction), joints (axes) 14R, 14L for rotation at the hip in the roll direction (y direction), joints (axes) 16R, 16L for rotation at the knee in the pitch direction, joints (axes) 18R, 18L for rotation at the ankle in the pitch direction and joints (axes) 20R, 20L for rotation at the ankle in the roll direction. Foot members 22R, 22L are provided at the lower end of this arrangement and a body (main unit) 24 housing the control unit 26 is provided at the upper end.

The hip joints in the foregoing configuration are constituted by the joints (axes) 10R(L), 12R(L) and 14R(L) and the ankle joints by the joints (axes) 18R(L) and 20R(L). The leg links of the respective legs thus have six degrees of freedom, so that during locomotion the legs as a whole can be caused to execute the desired movement by driving the 6×2=12 joints (axes) to appropriate angle. The robot is thus capable of walking freely within three-dimensional space. It will be noted that the hip and knee joints are connected by thigh links 28R, 28L and the knee and ankle joints by crus links 30R, 30L. The joints are provided mainly with electric motors as was mentioned earlier and reduction gear mechanisms for increasing motor torque. The structure of the joints is described in the assignee's earlier Japanese Patent Application No. 1(1989)324,218 (Japanese Laid-open Patent Publication No. 3(1991)184,782) etc., and since it is not an essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the foot members and also measuring the moment components Mx, My and Mz around the three axes, the six-dimensional force and torque sensor 36 detects whether or not the associated foot member has landed and the magnitude and direction of the forces acting on the supporting leg. The sole of each foot member is equipped at its four corners with touchdown switches 38 of conventional design for detecting whether or not the foot is in contact with the ground. The top of the body 24 is provided with a pair of inclination sensors 40, 42 for detecting the robot's inclination angle and angular velocity relative to the z axis in the x-z and y-z planes. The outputs of the sensors 36 and the like are sent to the control unit 26 in the body.

Figure 2:
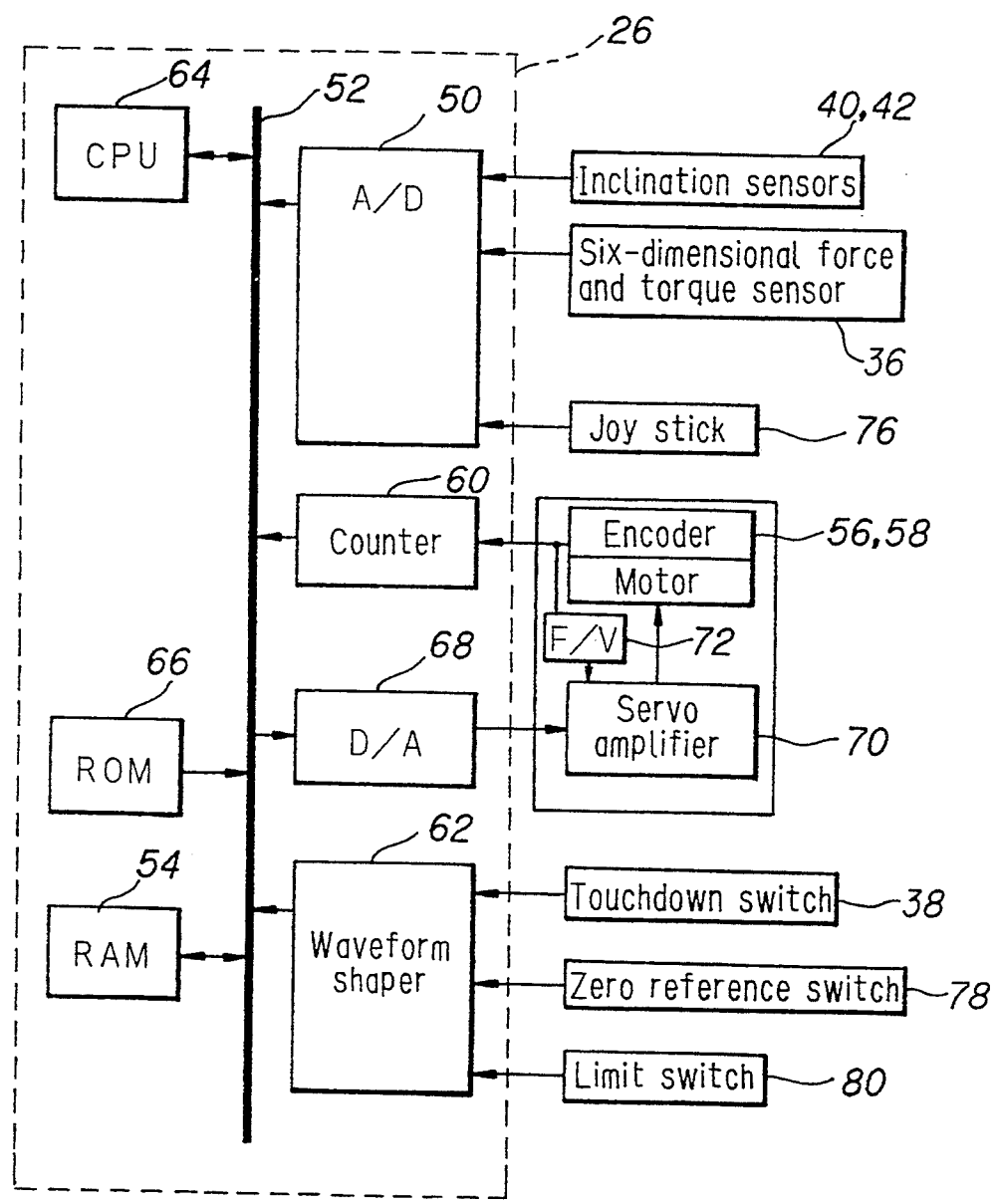
FIG. 2 is a block diagram showing the details of the control unit illustrated in FIG. 1.
Figure 3:
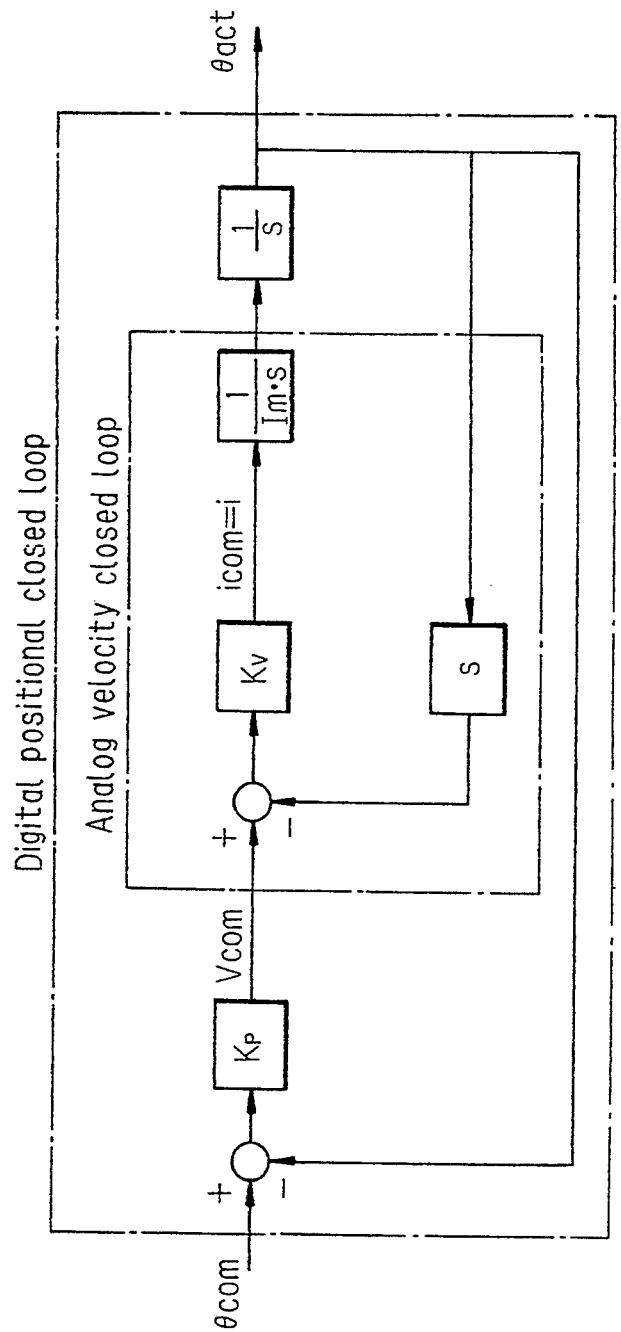
FIG. 3 is a block diagram showing the digital positional and analog velocity feedback control carried out by the control unit.

As shown in the block diagram of FIG. 2, the control unit 26 is constituted as a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors (only two encoders 56, 58 are shown in FIG. 1 by way of example) are input to the RAM 54 through a counter 60, while the outputs of the touchdown switches 38 and the like are stored in the RAM 54 via a waveform shaper 62. The control unit has a CPU (central processing unit) 64 which fetches locomotion data from a ROM (read-only memory) 66 and computes current command values from the deviation relative to the measured values received from the counter 60, and sends the same to a servo amplifier 70 of the respective motors via a D/A converter 68. As illustrated, the output of the individual encoders is forwarded to the associated servo amplifier 70 such that velocity feedback control is realized, as shown in FIG. 3, in addition to the positional feedback control. Reference numeral 76 designates a joy stick for inputting commands to change the robot's stride and other aspects of its gait, reference numeral 78 a zero reference switch for setting the robot's beginning attitude (upright), and reference numeral 80 a limit switch for preventing overruns. And, although it will be possible to carry out an additional posture control from the detected inclination angle or angular velocity, the gist of the invention does not reside therein so that no explanation will be made on the posture control based on the inclination angle or angular velocity detected.

Figure 4:
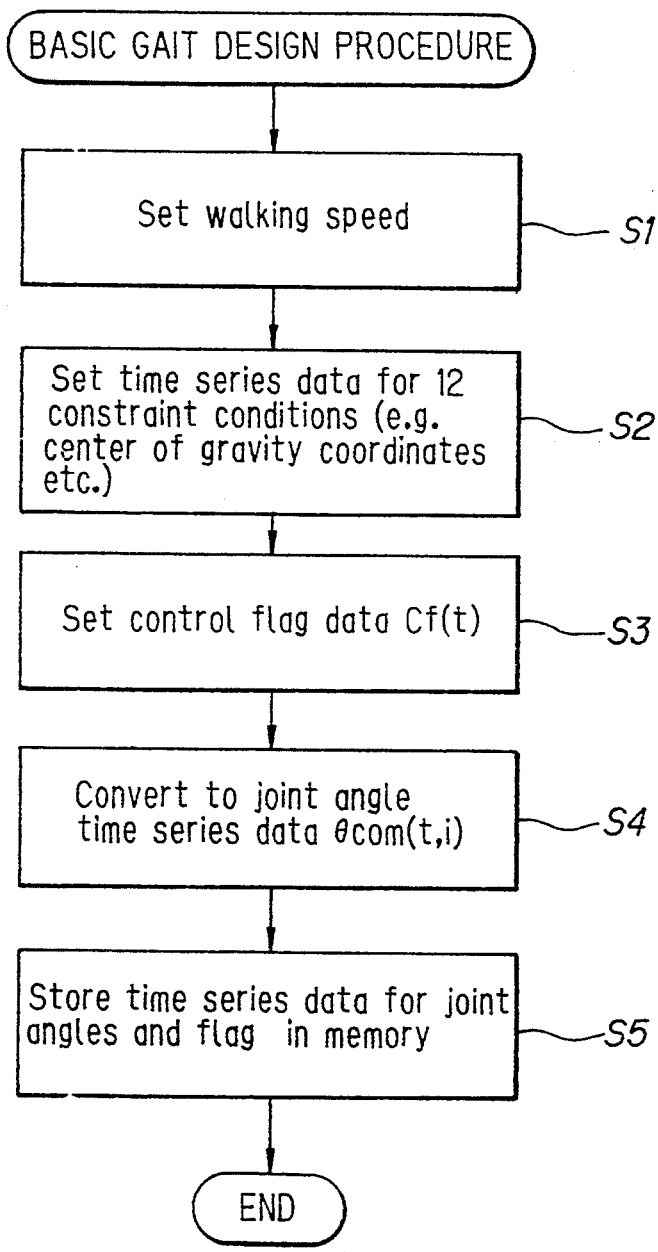
FIG. 4 is a flow chart showing the operation of the system carried out by the control unit for designing the robot's basic gait made up of attitude constraint conditions such as the position of the center of gravity so as to determine robot's joint angles inverse kinematically therefrom.

The operation of the control system according to the invention will now be explained with reference to the flow chart of FIG. 4 and the following Figures. The flow chart of FIG. 4 shows the procedure used for designing the robot's basic gait. This work is conducted offline in advance. It will be explained briefly in the following.

Figure 5:
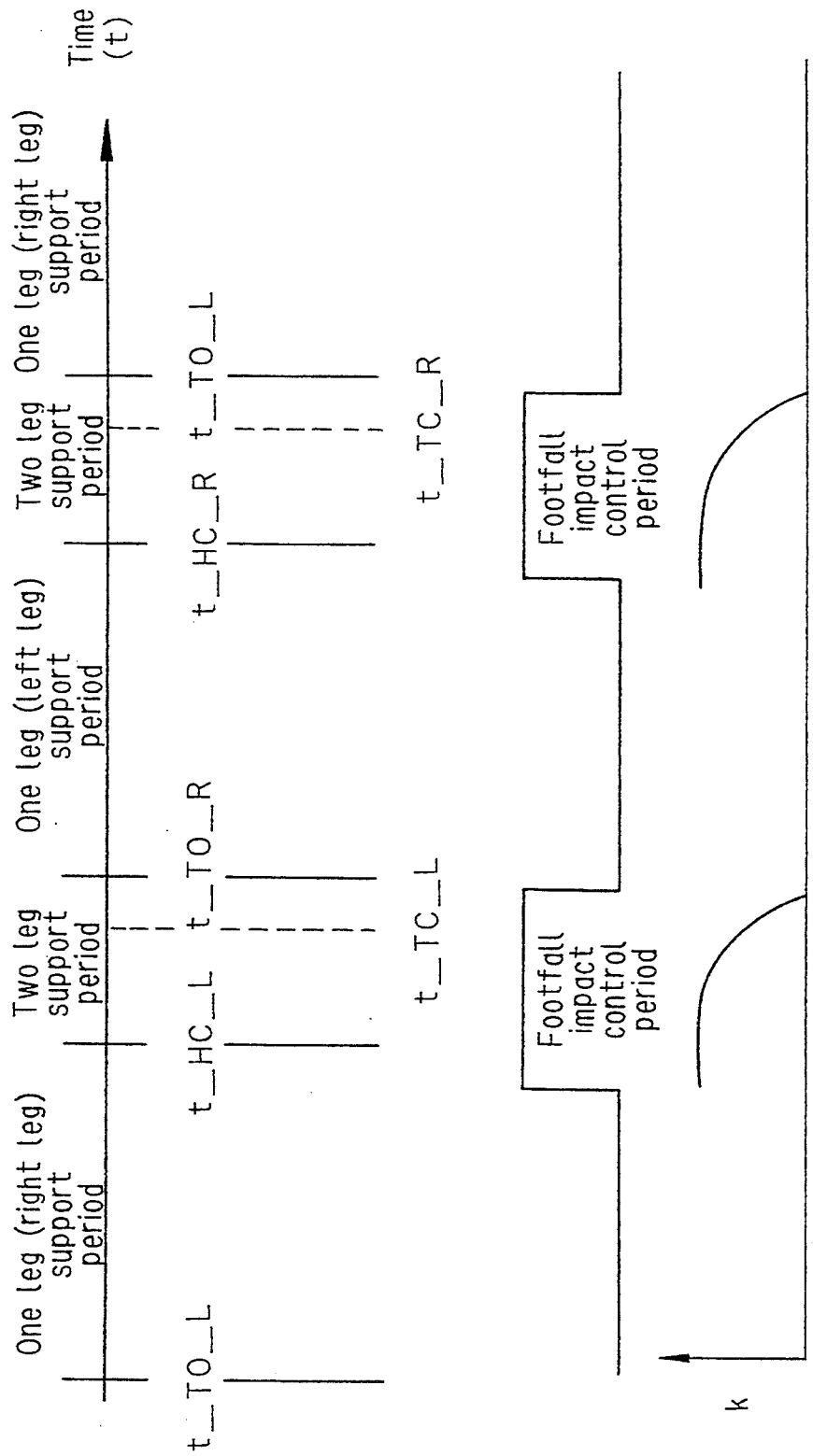
FIG. 5 is a timing chart showing a footfall impact control period referred to in the flow chart of FIG. 4.

The walking speed is set in step S1 and then the time series data of twelve constraint conditions (equations) are set in step S2 as required for the robot to assume an attitude to obtain the walking speed. The conditions are set not on joint angles, but on positions in coordinates such as the center of gravity, the toe of the robot 1, for example. Control then passes to step S3 in which control flag data Cf(t) is set ("t" indicating time). This flag determines the footfall impact control period and the like. (As shown in FIG. 5, the footfall impact control period in the control according to this invention extends from just before the time that the part of the sole 22R (L) analogous to the heel contacts the ground (indicated as t-HC in FIG. 5) to an appropriate time after the whole sole, including the part analogous to the toe, comes in contact with the ground (indicated as t-TC).) Next, in step S4, employing Newton's method (Newton-Raphson formula) the constraint conditions (equations) are inverse kinematically converted to time series data $\theta\text{com}(t,i)$ (hereinafter called the "standard joint angles") for the twelve joint angles of the robot 1 ("t" indicating time and "i" indicating the joint). Finally, in step S5, the joint angle time series data converted in step S4 and the control flag set are stored in the ROM 66 in the control unit of the robot 1.

Figure 6:
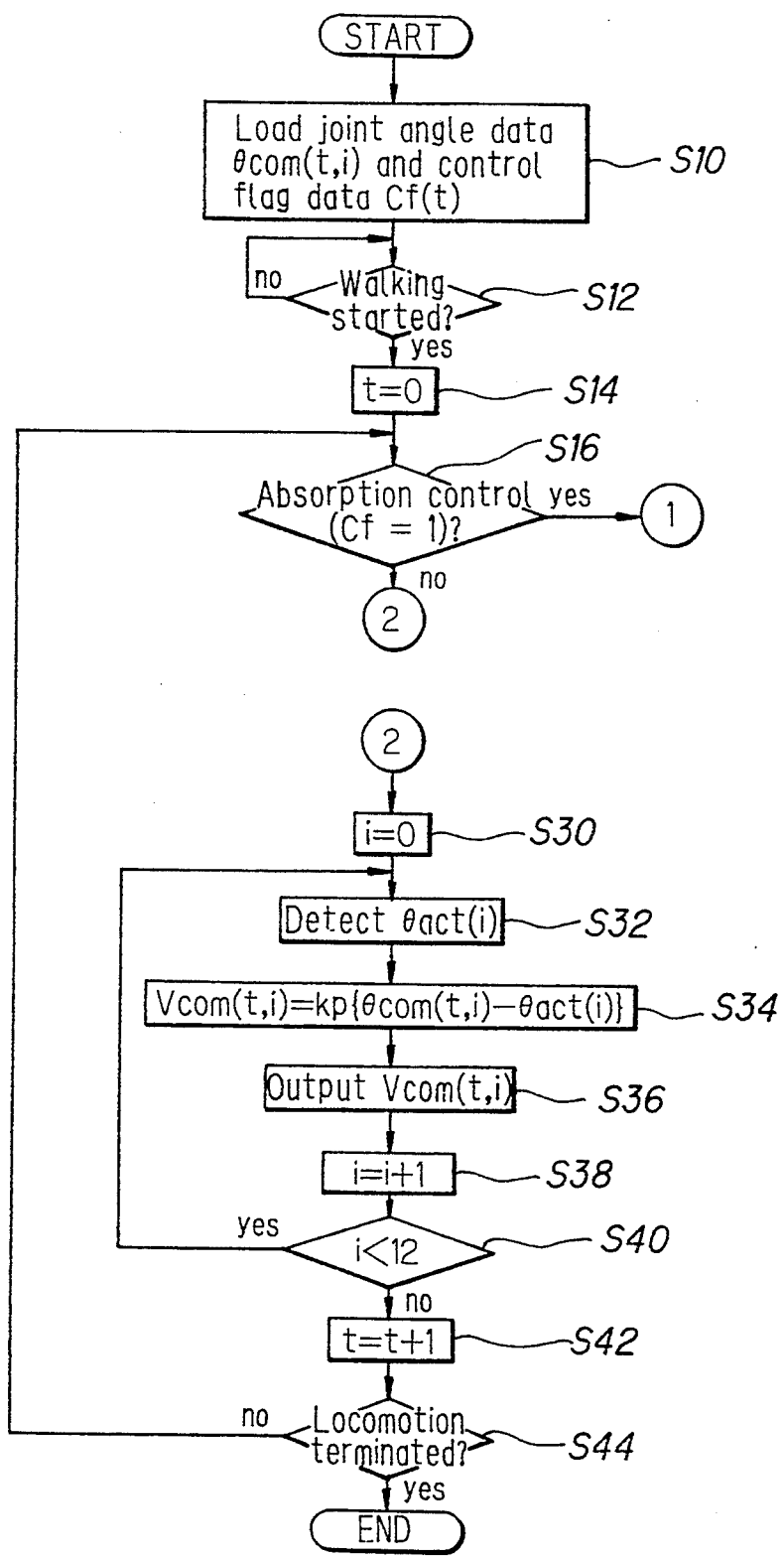
FIG. 6 is a flow chart showing the operation of the system carried out by the control unit for conducting a real-time locomotion control based on the designed basic gait.

The preset time series data is used to conduct real-time locomotion control in accordance with the flow chart of FIG. 6 (in, for example, 5-ms control cycles). After loading of the stored data in step S10, a check is made in step S12 as to whether or not walking has begun. If it has, control passes to step S14 in which the value of timer t is initialized to zero. Next, in step S16, whether or not impact absorption control is to be conducted is decided on the basis of the bit of the flag Cf(t).

Figure 7:
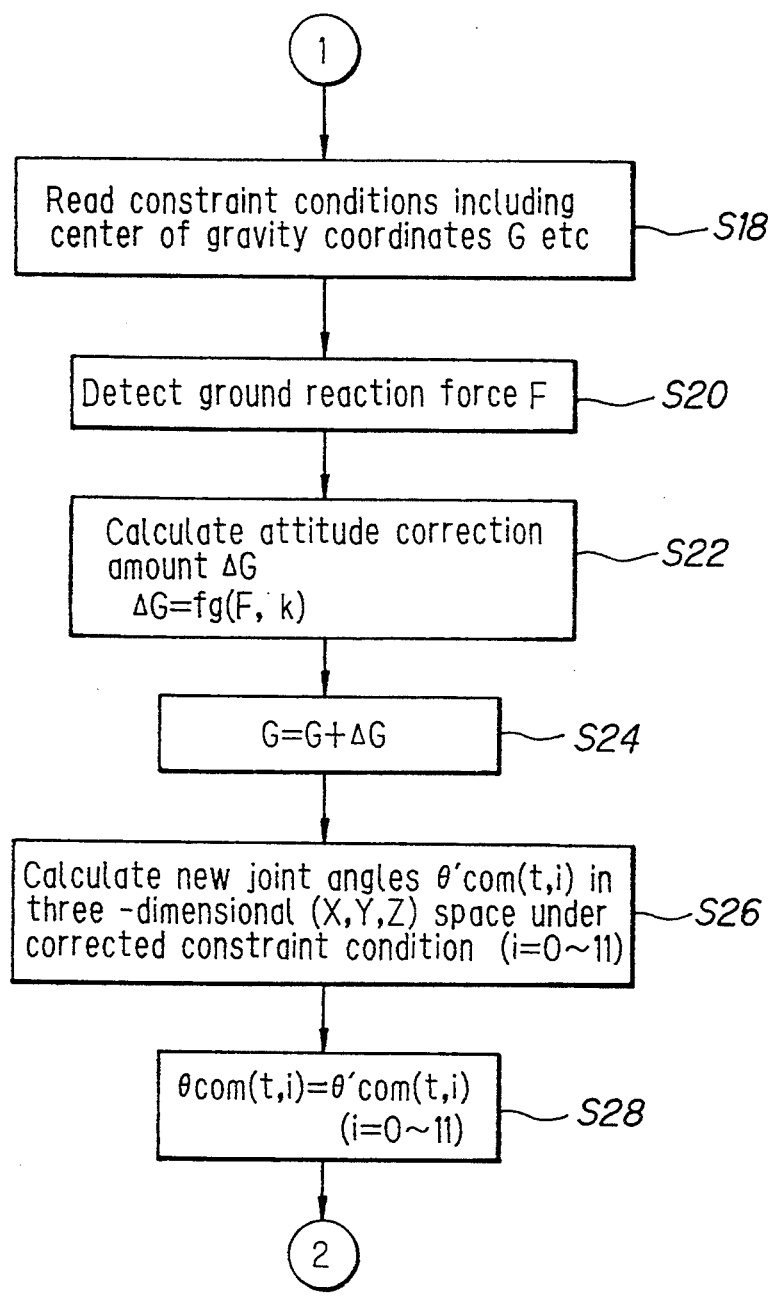
FIG. 7 is a flow chart constituting a part of the flow chart of FIG. 6 for correcting the originally designed attitude constraint conditions in response to the ground reaction force so as to recalculate the robot's joint angles in the footfall impact control period.
Figure 8A:
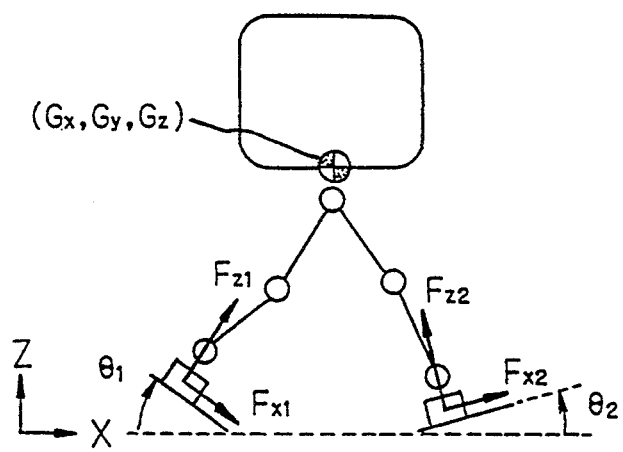
FIGS. 8A and 8B are explanatory views showing the determination of the ground reaction force referred to in the flow chart of FIG. 7.
Figure 8B:
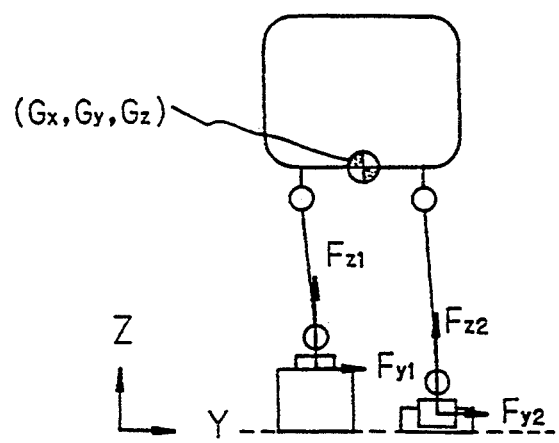

If the result in step S16 is that the impact absorption control period is running, control passes to step S18 of the flow chart of FIG. 7, in which the center of gravity G and other constraint condition data are read. (As shown in FIGS. 8A and 8B, the center of gravity G is indicated as the absolute coordinate positions Gx, Gy and Gz in a three dimensional space in which the vertical direction is designated Z, the direction of robot advance is designated X and the direction perpendicular to these directions is designated Y.

Next, in step S20, the ground reaction forces (footfall impact forces) Fx, Fy and Fz acting on the robot 1 are obtained. This is done by geometric calculation in accordance with the equations set out below using the forces $F_{x1,2}$, $F_{y1,2}$ and $F_{z1,2}$, which are detected by the six-dimensional force and torque sensor 36, and the rotation angles $\theta_{1,2}$ (about the Y axis), $\Phi_{1,2}$ (about the X axis) and $P_{1,2}$ (about the Z axis). As shown in FIG. 8, the subscripts 1, 2 indicate the left and right legs, respectively. Since the six-dimensional force and torque sensor 36 rotates with varying attitude of the robot 1, its outputs become as illustrated. In the illustrated example, the values of $\Phi_1$, $P_1$, $\Phi_2$ and $P_2$ are all zero.

$Fx=fx(\theta1,\Phi1,P1,Fx1,Fy1,Fz1)+fx(\theta2,\Phi2,P2,Fx2,Fy2,Fz2)$ $Fy=fy(\theta1,\Phi1,P1,Fx1,Fy1,Fz1)+fy(\theta2,\Phi2,P2,Fx2,Fy2,Fz2)$ $Fz=fz(\theta1,\Phi1,P1,Fx1,Fy1,Fz1)+fz(\theta2,\Phi2,P2,Fx2,Fy2,Fz2)$ Control then passes to step S22 in which an attitude correction amount (amount of center of gravity movement) delta G is calculated using the following equations.

*delta Gx=fg (Fx)·k*

*delta Gy=fg (Fy)·k*

*delta Gz=fg (Fz)·k*

Figure 9:
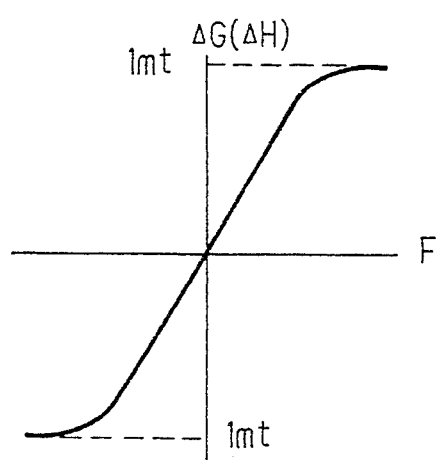
FIG. 9 is an explanatory graph showing the characteristics of the attitude correction amount of the originally designed attitude constraint conditions referred to in the flow chart of FIG. 7 so as to recalculate the robot's joint angles.

More specifically, as shown in FIG. 9, delta G is calculated from a primary function established with respect to the ground reaction forces (footfall impact forces) obtained in the preceding step and the result is multiplied by a coefficient k defined to vary with time as, for example, shown in FIG. 5. In other words, the correction amount is determined so as to move the center of gravity in the direction in which the ground reaction force acts and the magnitude thereof is reduced with the passage of time. As shown in FIG. 9, upper and lower limits of lmt are placed on the value of delta G. This is because setting the correction value too large relative to the ground reaction force may destabilize rather than stabilize the robot attitude.

Control next passes to step S24 in which the correction amount delta G is added to the preset center of gravity G coordinates and then to step S26 in which any of the twelve joint angles requiring correction under the corrected constraint condition (constraint conditions other than the center of gravity coordinates remain the same) are recalculated in real time.

Figure 10:
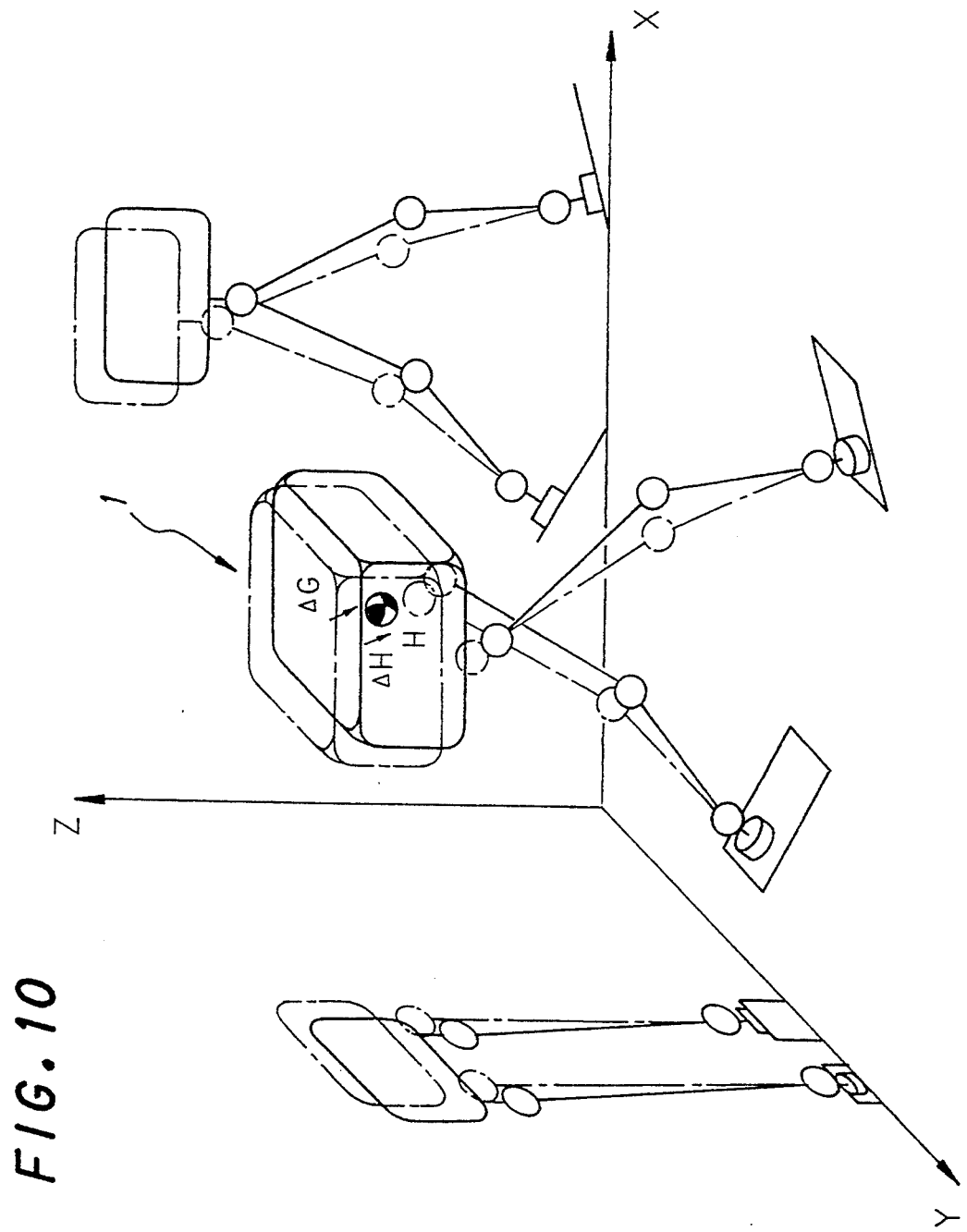
FIG. 10 is an explanatory view showing the attitude correction carried out in three-dimensional (X,Y,Z) space according to the procedures illustrated in the flow chart of FIG. 7.

In other words, as shown in FIG. 10, this embodiment computes corrected joint angles $\theta'\text{com}(t,i)$ for those among the twelve joints (the joints 10, 12 etc.) whose angles have to be corrected for enabling the robot 1 to assume the attitude in three-dimensional (X,Y,Z) space determined under the corrected constraint condition. As in step S4 of the flow chart of FIG. 4 explained earlier, the computation is again conducted employing Newton's method (Newton-Raphson formula). Since the joint angles are calculated from twelve constraint conditions, the matrix calculation is of the twelfth order. Control then passes to step S28 in which the standard joint angles are replaced with the corrected joint angles.

Control then passes to step S30 in the flow chart of FIG. 6, in which the joint number counter is initialized to zero (i=0), to step S32 in which the actual joint angle $\theta\text{act}(i)$ is detected, to step S34 in which the motor velocity command value Vcom(t,i) is determined by obtaining the product of gain kp and the deviation between the target value $\theta\text{com}(t,i)$ shown in FIG. 3 and the actual value, to step S36 in which the determined value is output, to step S38 in which the joint number counter value is incremented, to step S40 which repeats steps S32 to S38 until the count value becomes 12, and when it does, to step S42 in which the timer t is incremented, and to step S44 which returns control to step S16 for repeating the same operations at time t+1 (provided that locomotion has not been terminated).

Figure 20:
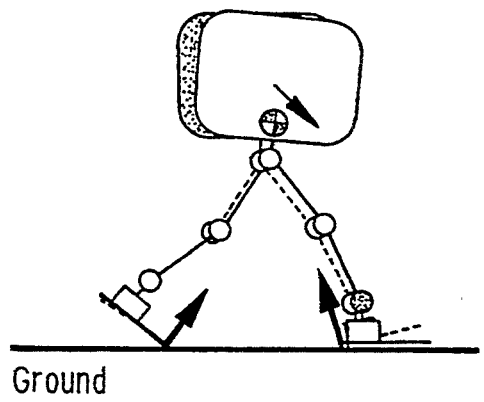
FIG. 20 is an explanatory view illustrating the footfall impact absorbing in a prior art technique.

As is clear from the foregoing, the present embodiment absorbs and softens footfall impact by using all twelve joints for conducting feedback to the robot state quantities so as to modify the robot's attitude as required for moving its center of gravity in the direction in which the ground reaction force acts. Therefore, as is apparent from a comparison of FIGS. 10 and 20, it becomes possible to achieve a much greater center of gravity shift than is possible by the conventional technique involving use of only the ankle joints. This in turn means a much larger impact absorption capacity. In addition, even when the whole sole is in contact with the ground, the embodiment can still achieve absorption and softening of footfall impact by, for example, a bending movement of the knees etc. Moreover, since all of the joints are controlled at such times, no interference arises between the different joints.

Figure 11:
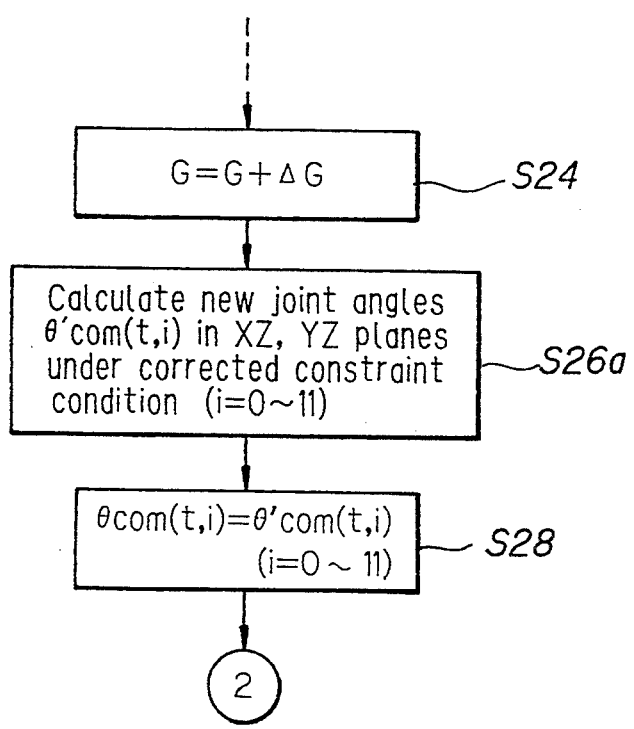
FIG. 11 is a portion of a flow chart, similar to FIG. 7, but showing a second embodiment of the invention in which the attitude correction is carried out in two-dimensional planes.
Figure 12:
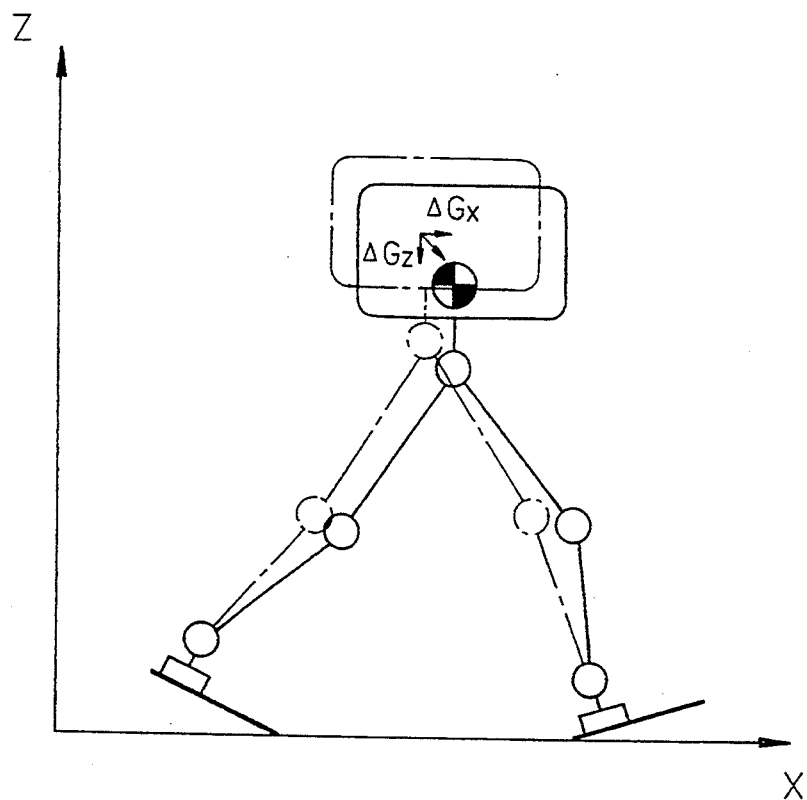
FIG. 12 is an explanatory view showing the robot's attitude separated into that projected on the XZ plane.
Figure 13:
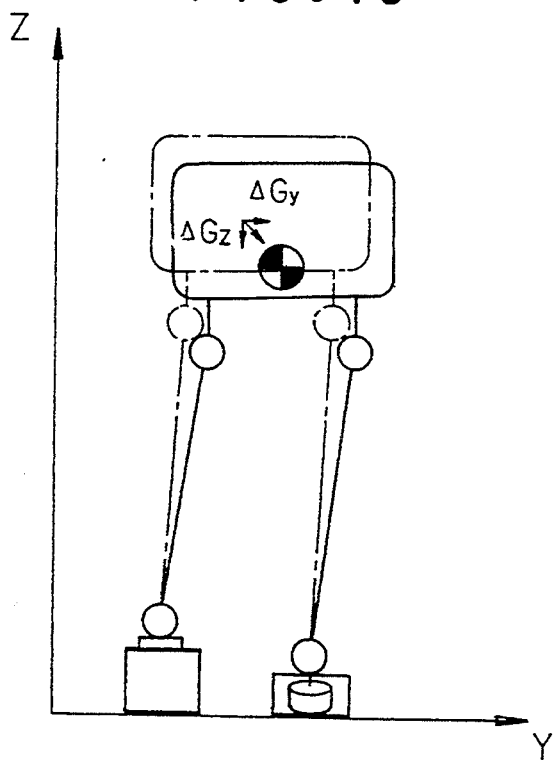
FIG. 13 is an explanatory view, similar to FIG. 12, but showing the attitude projected on the YZ plane.

FIG. 11 shows a second embodiment of the invention which differs from the first embodiment in the method of calculating the corrected joint angles. Specifically, step S26 of the flow chart of FIG. 7 is replaced by step S26a of FIG. 11, in which the attitude of the robot 1 in three-dimensional space is separated into attitudes projected on the XZ plane and the YZ plane as shown in FIG. 10. That is to say, the three-dimensional attitude is modeled in two-dimensional representations. The footfall impact absorption operation in the up/down and fore/aft directions is controlled by determining the joint angles from the attitude projected on the XZ plane (the XZ model of FIG. 12), while that in the left/right direction is controlled by determining the joint angles from the attitude projected on the YZ plane (the YZ model of FIG. 13). This expedient makes it possible to complete the calculations in a shorter time than in the first embodiment because the matrix computations for calculating the joint angles from the constraint conditions are of only the sixth and fourth orders in the XZ model and the YZ model, respectively (=6+4). Since the second embodiment provides substantially the same degree of center of gravity shift as the first, it achieves the same level of increase in footfall impact absorption and freedom from impact absorption period limitation as the first. Although the two-dimensional modeling of the robot's attitude in three-dimensional space may lead to interference between joints, the interference is of such small magnitude as to be negligible. The remainder of the configuration is the same as in the first embodiment.

Figure 14:
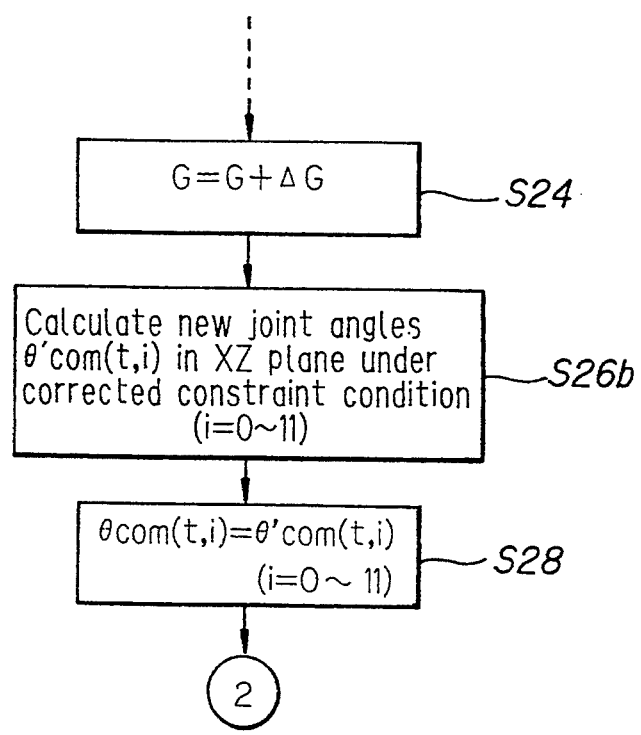
FIG. 14 is a portion of a flow chart, similar to FIG. 7, but showing a third embodiment of the invention in which the attitude correction is carried out solely in XZ plane.

FIG. 14 shows a third embodiment of the invention which differs from the first and second embodiments in that, as shown in step S26b of the same figure, the calculation of the corrected joint angles is further simplified by halting the impact absorption control for the left/right direction. This expedient is usable because the amount of footfall impact in the right/left direction is smaller than that in the fore/aft direction, which means that no substantial destabilization of the locomotion occurs even if the left/right direction impact absorption is not conducted. Therefore, while like the second embodiment the third embodiment also produces a two-dimensional model, it conducts impact absorption operation using only the XZ model. Specifically, it corrects the control values for only the joints 12, 16 and 18, which are the ones which drive in the X direction. It is therefore possible to complete the calculations in a shorter time than in the second embodiment because the matrix computations for calculating the joint angles are of only the sixth order. Since the third embodiment provides substantially the same degree of center of gravity shift as the first and second, it is able to achieve the intended purpose. The remainder of the configuration is the same as in the first embodiment.

Figure 15:
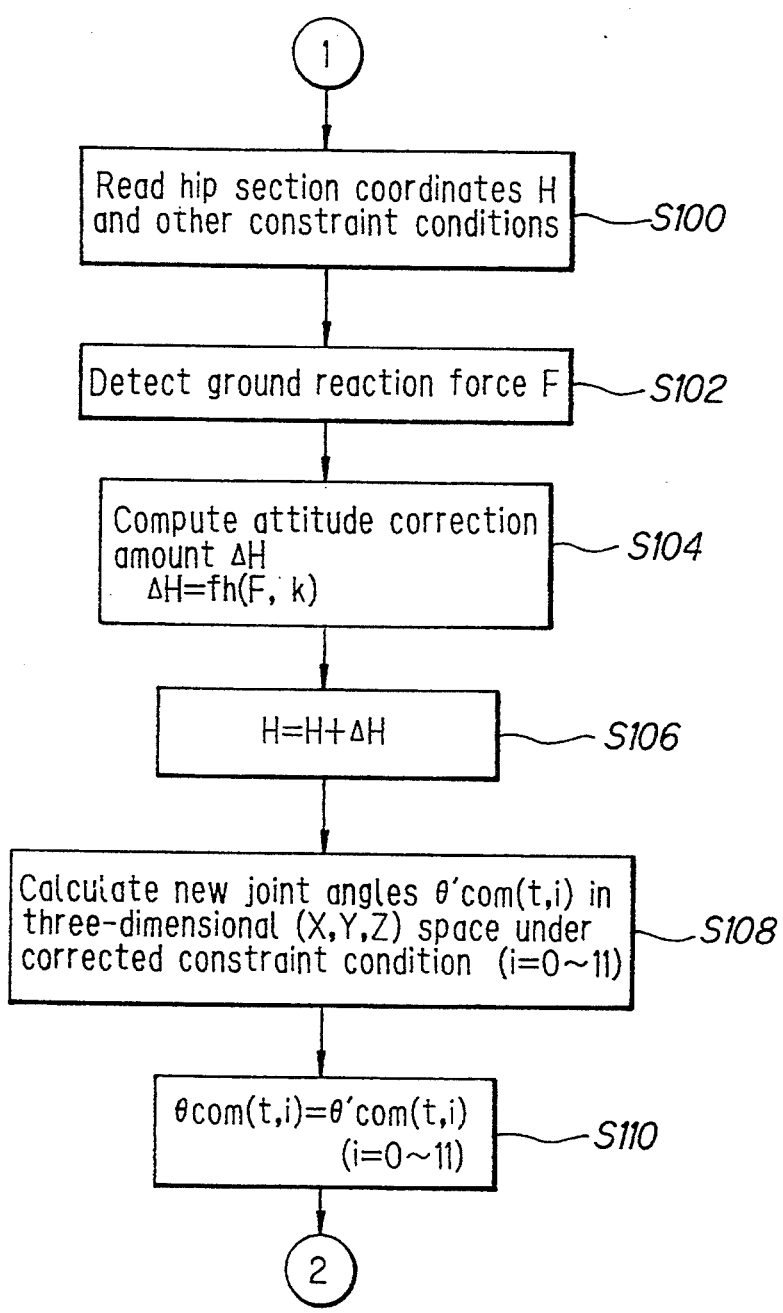
FIG. 15 is a flow chart, similar to FIG. 7, but showing a fourth embodiment of the invention in which the hip section, instead of the center of gravity, is used as one of the attitude constraint conditions such that the attitude correction is carried out by correcting the hip position in response to the ground reaction force.

FIG. 15 shows a fourth embodiment of the invention. The points of difference between this embodiment and the earlier ones are that the hip section is used in place of the center of gravity as a basic gait parameter and that the footfall impact force is fed back not to the center of gravity but to the hip section H (the hip section H is defined as being located on the central vertical section line at the bottom of the body 24; see FIG. 10) Specifically, when a footfall impact force (ground reaction force) F is received, the hip section, which is initially in the standard hip position H for standard gait, is shifted in the direction for absorbing the force by an amount delta H proportional to the magnitude of the force F. Feedback to the hip section is possible since in the case of the robot 1 shown in FIG. 10 the center of gravity remains around the hip section irrespective of what attitude the robot 1 assumes during locomotion. Because of this, the basic object of the invention (to increase footfall impact absorption amount) can be achieved by moving the hip section instead of the center of gravity. Moreover, one advantage this arrangement provides is that it eliminates the need to conduct the relatively large volume center of gravity position calculation otherwise required.

Figure 16:
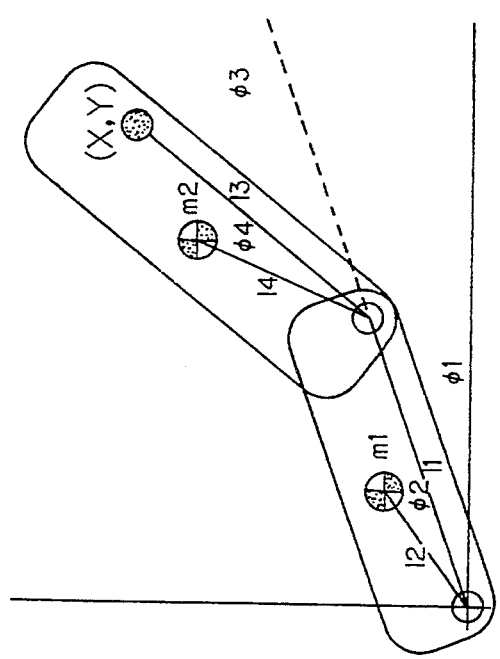
FIG. 16 is an explanatory view showing a comparison in a two-link model between the cases where the second link's tip position and the center of gravity of the entire link are calculated.

FIG. 16 shows a comparison between the case where the coordinates (X, Y) of the tip of a second link in a two-link model are calculated and the case where the center of gravity (Gx, Gy) of the entire link is calculated. From this it will be understood that the amount of calculation required for determining the center of gravity, which involves dynamic computations, is much greater than the amount of calculation required for determining the hip section, which involves only geometric calculations, and that the magnitude of this difference becomes extremely large in the case of the 13-link model (the robot 1) of this embodiment. Another advantage is that since a fixed position that does not change with attitude is used as a reference, it becomes possible to treat the right and left legs independently as will be explained later, which results in an additional reduction in the amount of computation required.

The fourth embodiment will now be explained primarily with reference to the differences between it and the earlier embodiments. The hip section is included among the attitude constraint conditions defined with respect to coordinates of step S2 of the flow chart of FIG. 4 beforehand, and the time series data (standard joint angles) are set in advance in steps S4 and S5. Following this, the constraint conditions, including the hip section coordinates H are read in step S100 of the flow chart of FIG. 15, the ground reaction force is detected in step S102 in the same manner as in the first embodiment, and the amount of correction of the hip section is computed in step S104. Taking the X direction as an example, similarly to in the first embodiment this is computed as, for instance (See FIG. 9);

$$delta\ Hx = fh(Fx) \cdot k$$

Control then passes to step S106 in which the correction amount delta H is added to the standard position H and to step S108 in which, as in the first embodiment, any of the twelve joint angles requiring correction are recalculated. As mentioned earlier, no dynamic computations are required. Since as a standard it is possible to use the hip section, which can be determined solely by geometric calculation, and further since the left and right legs can be treated independently, the relative positions of the hip section and sole as well as the rotation angle relationship can be taken into account independently and, as a result, the matrix computations for calculating the joint angles from the constraint conditions become sixth order +sixth order. Thus the amount of computation is much less and the computation time much shorter than in the first embodiment. In addition, since the distance between the center of gravity and the hip section is very small, the shifting of the hip section in response to and in the direction of a footfall impact force enables the object of the invention to be achieved to substantially the same degree as by the first embodiment.

Figure 17:
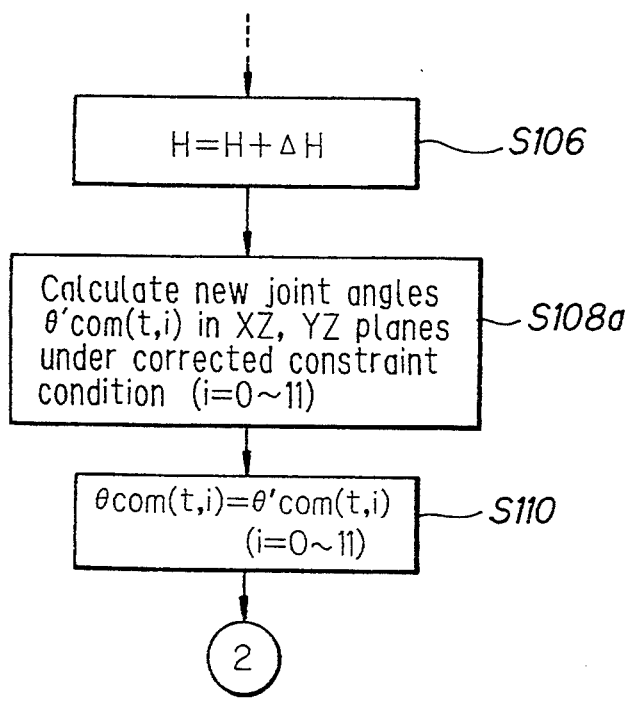
FIG. 17 is a portion of a flow chart, similar to FIG. 15, but showing a fifth embodiment of the invention.

FIG. 17 shows a fifth embodiment of the invention. In this embodiment, step S108 of the flow chart of FIG. 15 is replaced by step S108a, in which the joint angles are calculated using two-dimensional models. As in the second embodiment, the matrix computation for each of the left and right legs is thus of the third order with respect to the attitude projected on the XY plane and of the second order with respect to the attitude projected on the YZ plane. Since the orders of the overall computation are thus (3+2)+(3+2), a reduction in the amount of computation is realized. Since the hip section is used instead of the center of gravity, the computation is even further simplified. The remainder of the configuration is the same as in the fourth embodiment.

Figure 18:
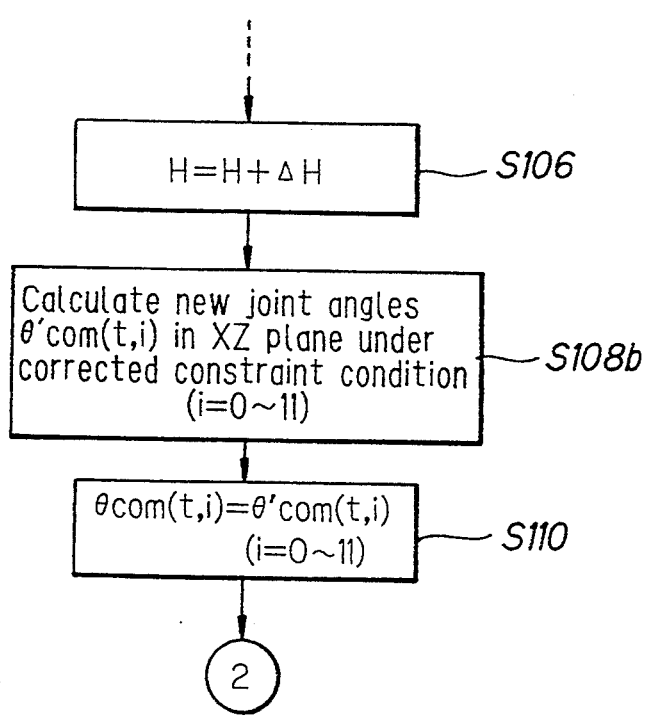
FIG. 18 is a portion of a flow chart, similar to FIG. 15, but showing a sixth embodiment of the invention.
Figure 19A:
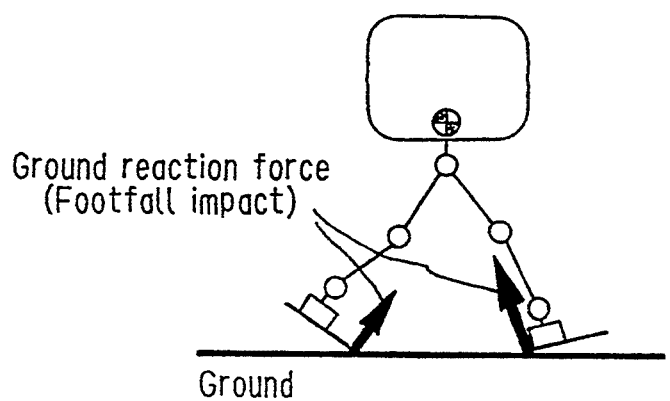
FIGS. 19A and 19B are explanatory views illustrating how the ground reaction force acts on a legged robot at the footfall.
Figure 19B:
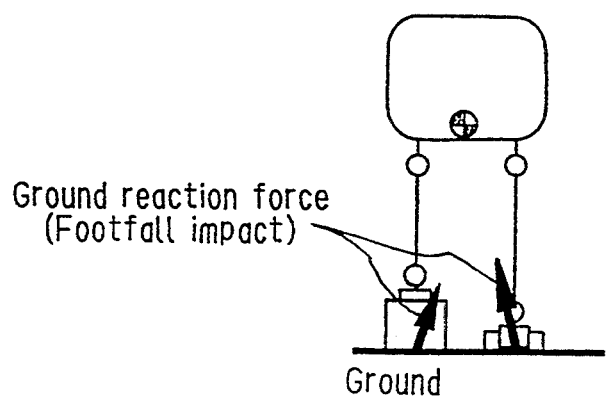

FIG. 18 shows a sixth embodiment of the invention. As indicated in step S108$b$, in this embodiment, as in the third embodiment, the joint angles are calculated using two-dimensional models and no impact absorption control is conducted with respect to the left/right direction. Aside from the point that it is the hip section that is shifted, the effect of this embodiment is the same as that of the third embodiment. The remainder of the configuration is the same as in the fourth embodiment.

In the fourth, fifth and sixth embodiments, the hip section was defined as being located on the central vertical section line at the bottom of the body 24, but, needless to say, the invention is not limited to this arrangement. Results similar to those of the foregoing embodiments can also be achieved using any other section or portion that, unlike the center of gravity, does not vary with the robot attitude and thus does not have to be determined by dynamic calculations involving relatively large amounts of computation, namely, that can be determined solely by geometric calculation, and that is in the vicinity of the center of gravity.

In addition, while only the ground reaction force (footfall impact force) was mentioned as an external force, the invention can also be used to correct for other detected forces, including external forces acting on the body and forces produced by shifting of internal members.

Further, the footfall impact control period need not necessarily be set as shown in FIG. 5 but can be defined in various other ways.

While the invention was explained with respect to legged mobile robots, specifically biped walking robots, it can also be applied to fixed-position robots and autonomous mobile robots falling in the class generally referred to as "industrial robots" as well as to legged mobile robots with three or more legs.

The present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling the locomotion of a biped walking robot having a body and two legs having leg joints, each connected to the body comprising:
   first means for preestablishing attitude constraint conditions for the robot's locomotion in coordinates defining a posture of the robot including a position of the robot's center of gravity obtained through a dynamic calculation or a predetermined portion of the robot obtained through a geometric calculation substantially corresponding to the robot's center of gravity when the robot is upright;
   second means for preestablishing the robot's desired joint angles inverse kinematically from the preestablished attitude constraint conditions;
   third means for detecting external force or moment acting on the robot when the leg lands on the ground;
   fourth means for calculating a correction amount in response to the detected external force or moment required for the position to shift in a direction in which the detected external force or moment reduces such that the robot's center of gravity shifts in the direction;
   fifth means for recalculating the attitude constraint conditions newly defining a posture of the robot in response to the calculated correction amount;
   sixth means for redetermining the robot's desired joint angles inverse kinematically from the recalculated attitude constraint conditions; and
   actuators on the legs for changing the joint angles of the leg joints to the desired joint angles, with the first, second, third, fourth, fifth and sixth means carried on the robot and controlling movement of the robot.

2. A system according to claim 1, wherein said sixth means determines the robot's joint angles in a three-dimensional space.

3. A system according to claim 1, wherein the portion obtained through a geometric calculation is the robot's hip section.

4. A system according to claim 1, wherein said sixth means determines the robot's joint angles in two-dimensional planes.

5. A system according to claim 4, wherein the portion obtained through a geometric calculation is the robot's hip section.

6. A system according to claim 1, wherein said sixth means determines the robot's joint angles in one of two-dimensional planes.

7. A system according to claim 6, wherein the portion obtained through a geometric calculation is the robot's hip section.

8. A system according to claim 1, wherein said sixth means determines the robot's joint angles inverse kinematically from the recalculated attitude constraint conditions over a predetermined period of time including the time at which the leg is brought into contact with the ground.

9. A system according to claim 1, wherein said fourth means calculates the correction amount by multiplying the detected external force by a coefficient.

10. A system according to claim 9, wherein the coefficient decreases gradually within a predetermined period of time including the time at which the leg is brought into contact with the ground.

11. A system according to claim 1, wherein said fourth means compares the correction amount with a reference value, and when the correction amount exceeds the reference value, limits the correction amount to the reference value.

* * * * *